(12) United States Patent
Vergnes

(10) Patent No.: US 6,954,866 B2
(45) Date of Patent: Oct. 11, 2005

(54) METHOD AND APPARATUS FOR SMOOTHING CURRENT CONSUMPTION IN AN INTEGRATED CIRCUIT

(75) Inventor: Alain Vergnes, Trets (FR)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 10/883,203

(22) Filed: Jun. 30, 2004

(65) Prior Publication Data

US 2005/0027471 A1 Feb. 3, 2005

(30) Foreign Application Priority Data

Jul. 17, 2003 (FR) .............................................. 03 08735

(51) Int. Cl.⁷ ................................................ G06F 1/32
(52) U.S. Cl. ........................ 713/320; 713/189; 713/340
(58) Field of Search ................................. 713/320, 340, 713/189

(56) References Cited

U.S. PATENT DOCUMENTS 5,086,467 A * 2/1992 Malek ........................ 380/252
5,995,629 A 11/1999 Reiner ......................... 380/50
6,320,770 B1 * 11/2001 Feuser ......................... 363/59
6,490,646 B1 * 12/2002 Leydier ....................... 710/301

FOREIGN PATENT DOCUMENTS

WO   WO 00/23866   4/2000   ............. G06F/1/00

* cited by examiner

*Primary Examiner*—Rehana Perveen
(74) *Attorney, Agent, or Firm*—Sierra Patent Group, Ltd.

(57) ABSTRACT

The invention includes a system for smoothing current consumption in a digital logic module. A processing circuit is configured to receive an input and manipulate the input during a processing time period to produce an output. A non-processing time period follows production of the output. The processing circuit is further configured to draw an active range of current during the processing time period and an inactive range of current during the non-processing time period. The system comprises a smoothing circuit coupled to the processing circuit and configured to engage the processing circuit during the non-processing time period. The smoothing circuit is also configured to cause the processing circuit to draw an active range of current during the non-processing time period.

11 Claims, 9 Drawing Sheets

METHOD AND APPARATUS FOR SMOOTHING CURRENT CONSUMPTION IN AN INTEGRATED CIRCUIT

CROSS-REFERENCE TO RELATED APPLICATIONS

This application claims priority to French Patent Application Ser. No. 03 08735, filed Jul. 17, 2003.

BACKGROUND

1. Field of Invention

The present invention relates to smoothing current consumption in digital logic modules and more particularly to reshaping current in processors in order to make current analysis more difficult.

2. Prior Art

FIG. 1 is schematic illustrating a prior art simplified microcontroller. A microcontroller generally includes a microprocessor, memory, a peripheral module that provides communication, for example, Universal Asynchronous Receiver/Transmitter (UART), SPI, and USB, and an interrupt controller. Microcontroller 100 includes microprocessor 102 coupled to memory 104. Address decoder 106 receives and decodes addresses from microprocessor 102 for memory 104 and peripherals 108. Address decoder 106 and peripherals 108 receive addresses on address bus 110 while address decoder 106 transmits select information on memory select 112 and peripheral select 114. Data is transmitted between microprocessor 102, memory 104, and peripherals 108 on data bus 116. A read or a write signal is transmitted between microprocessor 102 and memory 104 and peripherals 108 on read/write signal 117. Microcontroller 100 receives clock signal 118 and reset signal 120. Input 122 includes, for example, timer triggers and UART input data while output 124 includes, for example, UART transmitter output data. Interrupt controller 126 collects and processes interrupt signals from peripherals 108 along an interrupt line (not shown).

Peripherals 108 may be functional logic, for example UART, crypto-processing, digital signal processing (DSP), and digital filtering.

FIG. 2 illustrates one example of a peripheral, a crypto-processor. With a crypto-processor, if a buffer of data must be ciphered or deciphered, software divides the buffer into several parts. Each part represents data able to be processed during a processing time period. As soon as the part is input to the crypto-processor and/or a start signal is applied, the peripheral begins to process the part. After a period of clock cycles the processing period ends and the crypto-processor provides a ciphered/deciphered part that can be read back by the software. When the data processing is finished, the non-processing time period begins and an interrupt signal may be asserted to inform the microprocessor that the part is ready for reading and crypto-processor is ready to cipher/decipher a new part. Once the new part is input to the crypto-processor and/or a start signal is applied, the non-processing time period ends and a new processing time period begins. The software continues reading and writing parts up to the end of the data buffer.

As the algorithm used by the crypto-processor is executed, current consumption due to digital cell switching increases when the processing starts and decreases when processing ends. The current increases due to operation of the combinatorial (for example AND, OR, INVERT, MUX, and XOR) and sequential (D flip flops, or DFFs) cells in the digital module that execute the algorithm. During a non-processing time period, typically the only toggling is on the clock pins of DFFs. This value, together with a static leakage current, is not significant compared to the current consumed when processing is active.

User interface module 200 processes system data, for example address, data, read/write, and select signals, in order to generate commands and data for algorithm module 202. Algorithm module 202 performs cipher/decipher according to control command, data and a cipher/decipher key provided by user interface module 200. Counter 108 receives a start signal from user interface 200 and organizes the data path into algorithm module 202.

A crypto algorithm may be represented as a basic combinatorial function concatenated several times to obtain the result. For example, a basic combinatorial function is implemented once and connected to storing means (DFFs or others). A multiplexer is required to select the input of the algorithm function (data input or intermediate result) depending on a counter module n value (n being the number of iteration to perform to obtain the result, 16 for example in the Data Encryption Standard (DES)). The Triple Data Encryption Standard (TDES) uses three, 16 iteration periods.

Counter 204 receives a start signal on start line 206. The start signal triggers a first-cycle signal from counter 204 to multiplexer 208 in algorithm module 202. Multiplexer 208 receives first-cycle signal and selects input from in-data line 210. Input data then goes to combinatorial circuit 212, which, in combination with a key and a cipher, manipulates the input data. Combinatorial circuit 212 begins processing upon receipt of the first-cycle signal and the input data, thus beginning the processing period. Combinatorial circuit 212 transmits the manipulated input data to multiplexer 213. During processing time period, multiplexer 213 receives processing period signal from counter 204 and therefore selects data from combinatorial circuit 212. Multiplexer 213 transmits the manipulated input data to DFF 214, which then sends the manipulated data to output 216, multiplexers 208 and 213. For subsequent iterations, no first-cycle signal is transmitted to multiplexer 208, so multiplexer 208 selects the manipulated input data from DFFs 214 and sends it to combinatorial circuit 214, which again manipulates the input data. Counter 204 keeps track of each iteration and counts down until the last iteration. At the last iteration, counter 204 sends a last-cycle signal to combinatorial circuit 212, indicating the end of the processing time period. Processing period signal from counter 108 triggers multiplexer 213 to select input from DFF 214 rather than combinatorial circuit 212. DFF 214 receives recycled data, which at this point in the cycle is desired output data. An interrupt signal is sent from counter 204 indicating that data available at output 216 is a desired output, so user interface module 200 retrieves the output data from output 216 on the appropriate clock cycle.

At the end of processing time period counter 204 is reset and waits for a new sequence to be started. FIG. 3 is a graph illustrating a timing diagram and a current waveform representing activation of combinatorial circuit 212 during the processing period.

When a buffer of data is processed, current consumption can be seen as a series of pulses. The low level period of this waveform represents the current consumption of the clock tree and the clock pin of the DFFs of the peripheral module. The high level period represents combinatorial circuit 212 switching current. By synchronizing external digital analyzer equipment on the rising edge of the pulses, it is possible to store a digital representation of the current. This model can be processed to extract the "key" value of the algorithm without destroying the integrated circuit with an intrusive attack (processing the model is often referred to as a non-intrusive attack). It is based on the difference in current consumption when different data are processed.

FIG. 3 illustrates clock signal 300 and input data 305. Input data 305 is available on input data line 210 (FIG. 2) and represents part of the divided buffer of input data. Start signal 310 is transmitted along start line 206 and triggers the beginning of processing time period 315. Counter 204 counts down, in this case from 15 to zero for DES, with interval value 320. First-cycle signal 325 transmits from counter 204 in conjunction with the first count on interval counter 320. Last-cycle signal 330 transmits from counter 204 in conjunction with the last count on interval counter 320, and signals the end of processing time period 315 and the beginning of non-processing time period 335. Combinatorial circuit 212 is driven with input data during processing time period 315, drawing more current than during non-processing time period 335.

If a clock period is used to schedule the different steps of data processing, processing time period 315 may be detected or observed by non-intrusive methods like current consumption shape analysis. Each time data is processed the current increases to an active range of current, and then decreases to an inactive range of current during non-processing time period 335. Consequently, it is possible to determine data processed inside an integrated circuit.

What is needed is a system and method of making the analysis of current consumption more difficult.

SUMMARY OF THE INVENTION

The invention consists of filling the non-processing time period with a current value close to the value (and shape) of the current during the processing time period. The invention may be used in any circuit where digital logic modules are embodied. The invention takes place in the digital part of an integrated circuit. When data is processed in a digital module, combinatorial logic operates and causes an increase in power consumption. The increase in current is primarily due to cell switching, considering only the digital logic. The total cell leakage current is low compared to this switching current.

The system and method reshapes current consumption in order to make current analysis more difficult. Current reshaping is performed during the non-processing time period by the same digital logic that created the current shape during the processing time period, leading in a similar current waveform whether data is processed or not.

DETAILED DESCRIPTION OF THE INVENTION

Figure 1:
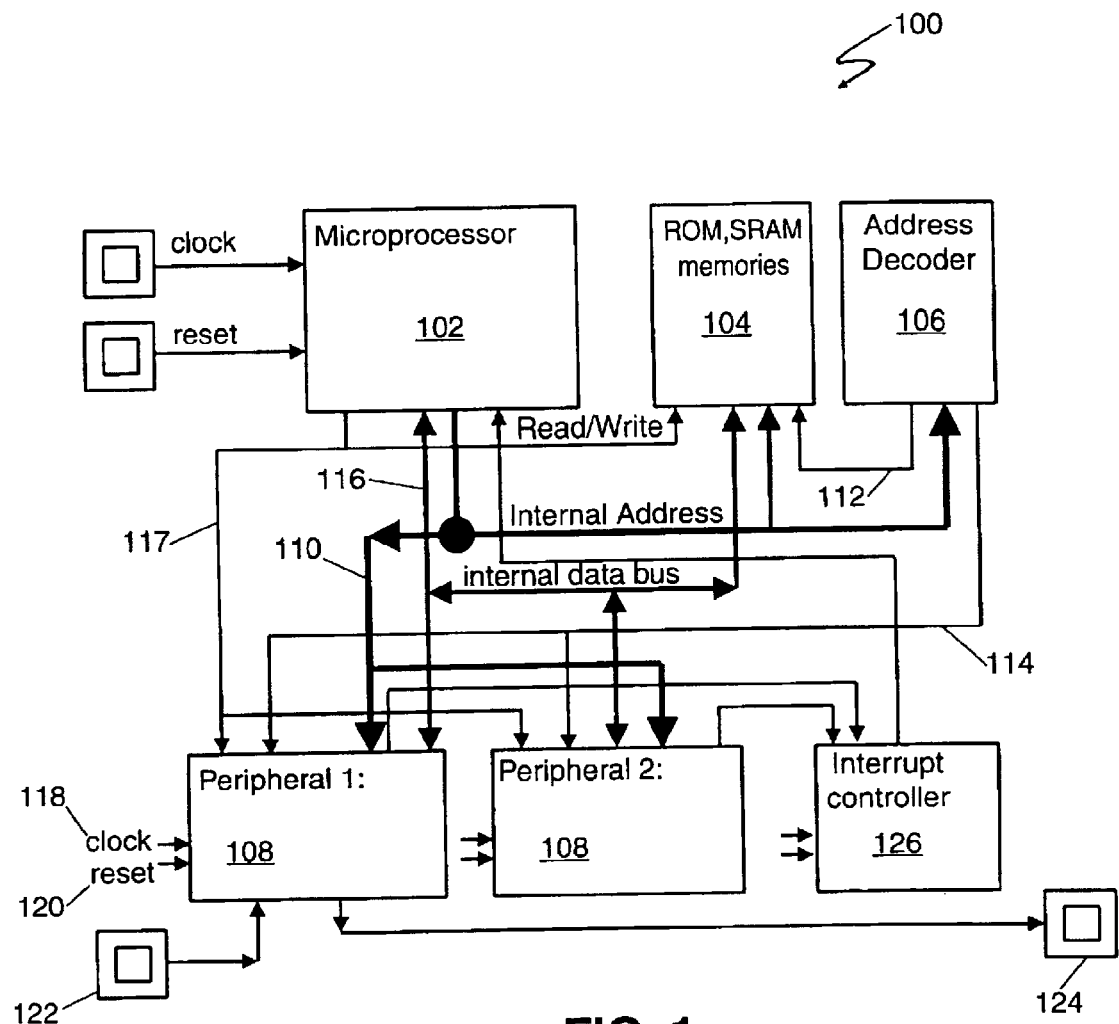
FIG. 1 is a prior art schematic illustrating a simplified microcontroller.
Figure 2:
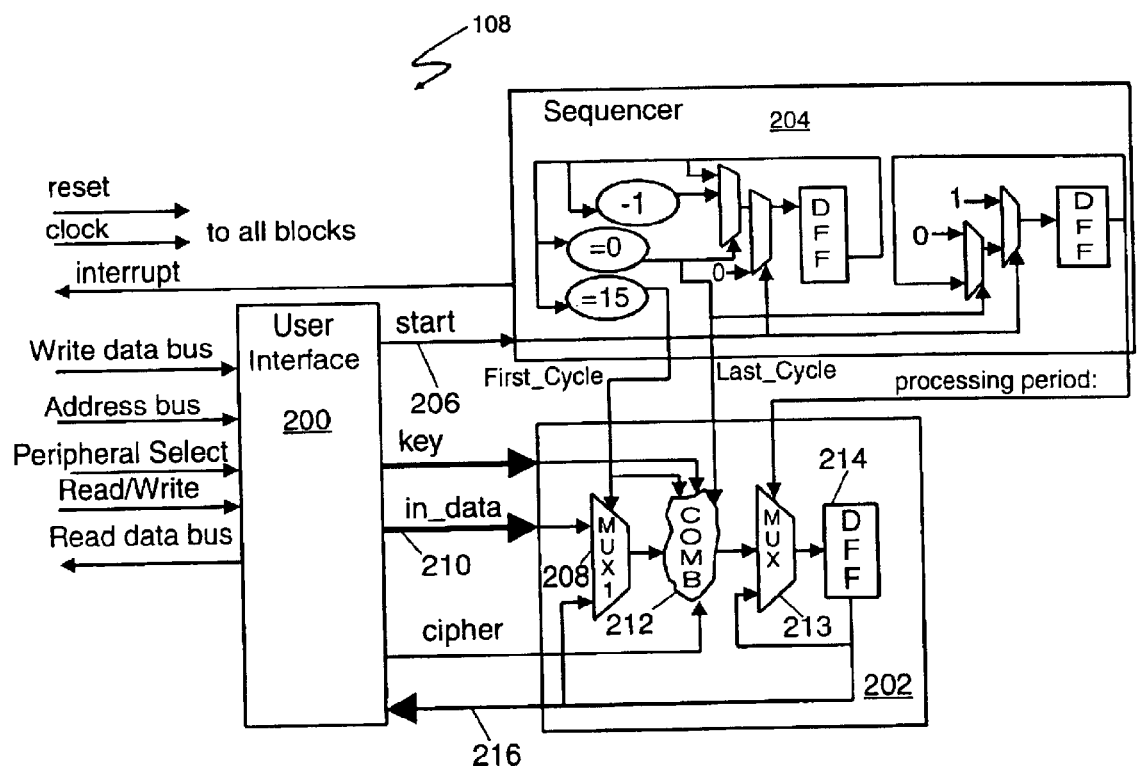
FIG. 2 is a prior art schematic illustrating one example of a peripheral.
Figure 3:
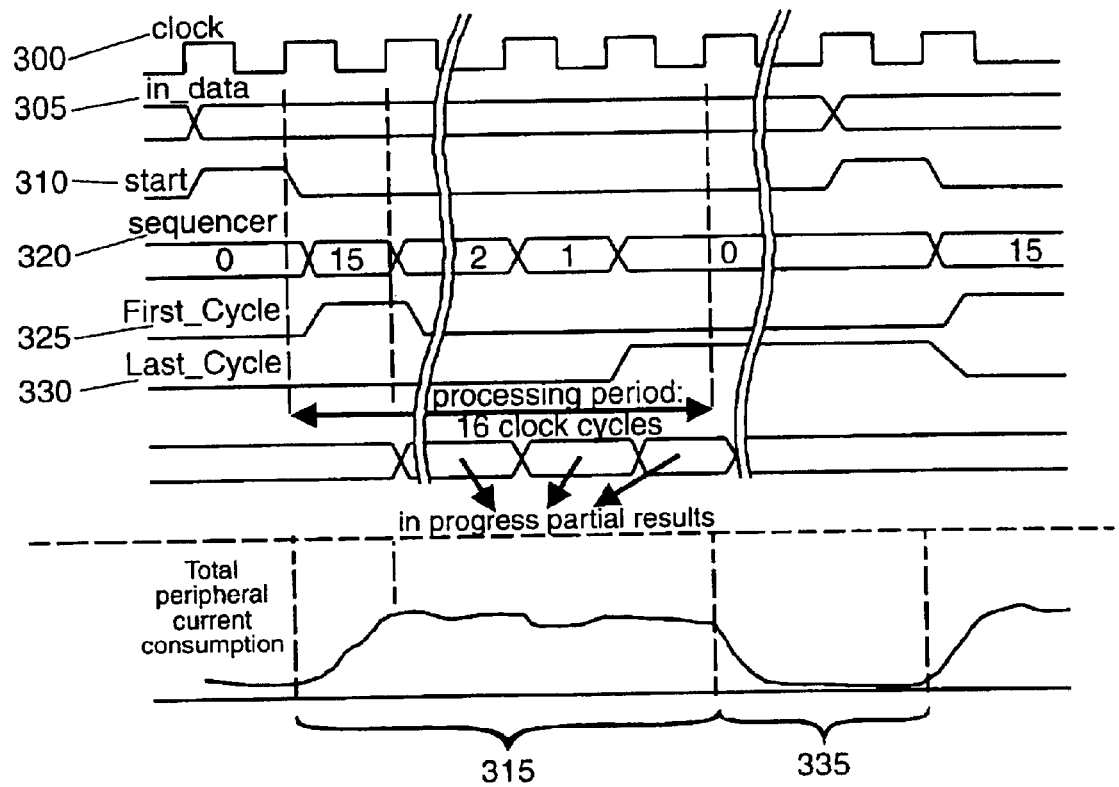
FIG. 3 is a prior art graph illustrating a timing diagram and a current waveform for a peripheral from FIG. 2.
Figure 4:
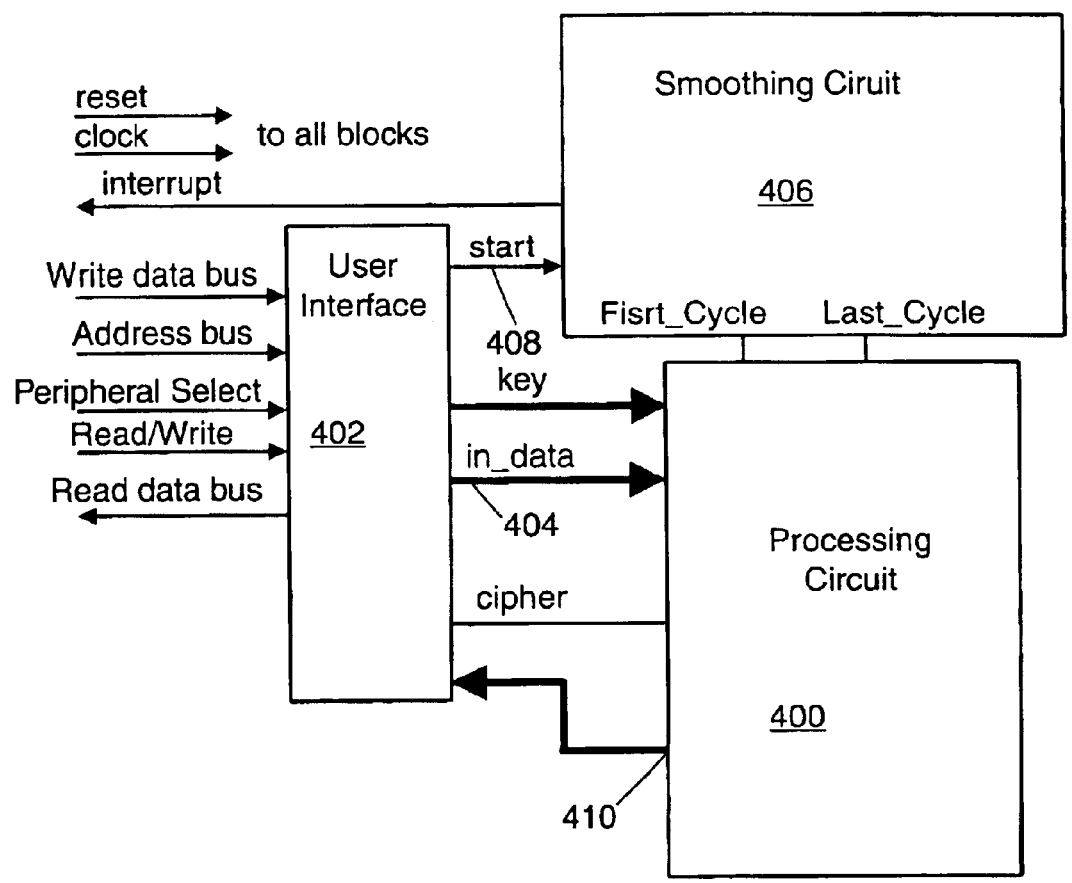
FIG. 4 is a schematic illustrating one embodiment of the invention in a microcontroller.

FIG. 4 is a schematic illustrating one embodiment of the invention in a digital logic module, or a peripheral of a microcontroller. Processing circuit 400 receives input from user interface 402 along input line 404. Smoothing circuit 406 receives a start signal along start line 408 from user interface 402. Smoothing circuit 406 transmits a first-cycle signal to processing circuit 400, which begins a processing time period. During a processing time period, processing circuit 400 is manipulating the input in order to produce a desired output, for example an encrypted or decrypted version of the input. Due to the manipulation, for example logic cell switching, processing circuit 400 draws an active range of current during the processing time period. At the end of the processing time period, smoothing circuit 406 transmits a last-cycle signal to processing circuit 400 and the manipulated input is ready at output port 410 as output.

The end of the processing time period is the beginning of the non-processing time period. Smoothing circuit 406 engages processing circuit 400 during the non-processing time period in order that processing circuit 400 draws the same range of current during the non-processing time period as during the processing time period. In one embodiment, operation of processing circuit 400 during the non-processing time period does not alter the output available at output port 410.

Figure 5:
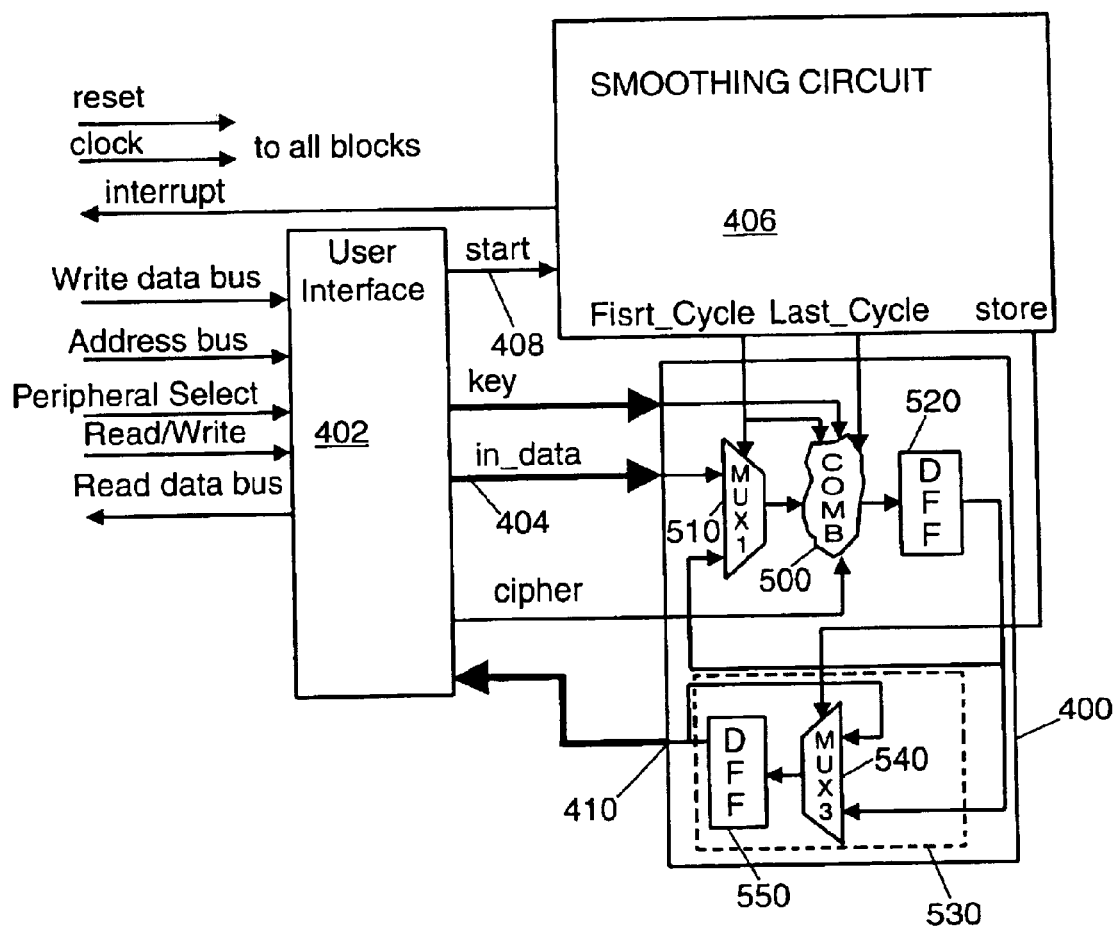
FIG. 5 is a schematic illustrating one embodiment of the invention from FIG. 4.

FIG. 5 is a schematic illustrating a more detailed embodiment of the invention from FIG. 4. FIG. 5 includes user interface 402, smoothing circuit 406 and processing circuit 400. In one embodiment, processing circuit 400 includes combinatorial circuit 500 coupled to multiplexer 510. Multiplexer 510 receives input from input line 404. If multiplexer 510 also receives a first-cycle signal from smoothing circuit 406, then multiplexer 510 selects the input from input line 404 and sends it to combinatorial circuit 500. Combinatorial circuit 500 manipulates the input and delivers the manipulated input to DFFs 520. In one embodiment, combinatorial circuit 500 receives a first-cycle signal and a last-cycle signal. In another embodiment, combinatorial circuit 500 does not receive first-cycle signal and/or last-cycle signal. First-cycle signal and last-cycle signal control data flow during the processing time period and the non-processing time period.

DFFs 520 send the manipulated input to storage circuit 530 and to multiplexer 510. Now in the second cycle, multiplexer 510 does not receive a first-cycle signal so it transmits the manipulated input from DFFs 520 to combinatorial circuit 500. Smoothing circuit 406 keeps track of the number of iterations necessary for the input to pass through combinatorial circuit 500.

During each iteration, DFFs 520 transmit each cycle of manipulated input to storage circuit 530. Throughout the processing time period storage circuit 530 receives an intermediate result that is not the desired output. At the end of the processing time period, after the input has been sufficiently manipulated to produce the desired output, smoothing circuit 406 transmits a store signal to storage circuit 530. After storage circuit 530 receives the store signal it stores the desired output and makes it available at output port 410 throughout the non-processing time period. At the beginning of the next processing time period, storage circuit 530 continues to make the previously desired output available at output port 410 until the next store signal.

During the non-processing time period, combinatorial circuit 500 continues to manipulate input supplied from multiplexer 510, despite having produced the desired output. The desired output is stored in storage circuit 530, made available to output port 410 and not affected by the continued manipulation of combinatorial circuit 500 during the non-processing time period. At the end of the non-processing time period and the beginning of the next processing time period, smoothing circuit 406 receives a start signal and sends a first-cycle signal to multiplexer 510, which then selects the input available on input line 404. The remainder of the next processing time period proceeds as described above.

In one embodiment, storage circuit 530 comprises multiplexer 540 and DFFs 550. Multiplexer 540 receives manipulated input from DFFs 520 and input from DFFs 550 during the processing time period. Until multiplexer 540 receives a store signal from smoothing circuit 406, multiplexer 540 selects input from DFFs 550 to output to DFFs 550. DFFs 550 make the input from multiplexer 540 available to output port 410 and multiplexer 540. The same value cycles between multiplexer 540 and DFFs 550 until the store signal toggles multiplexer 540 to select the desired output, available at the end of the processing time period.

In one embodiment, assertion of first-cycle signal is removed during the non-processing time period. DFF 625 may output to an AND gate (not shown) that receives the first-cycle signal, so that only when the start signal has been transmitted and not yet reset does the first-cycle signal trigger. This embodiment could make it more difficult to analyze a TDES algorithm, where special processing is performed during the first cycle of each DES period. This special processing leads to a different current value due to the fact that it reproduces exactly the differences in consumption that occur during the first and last processing cycles. A similar idea applies to the last-cycle of each DES period.

Figure 6:
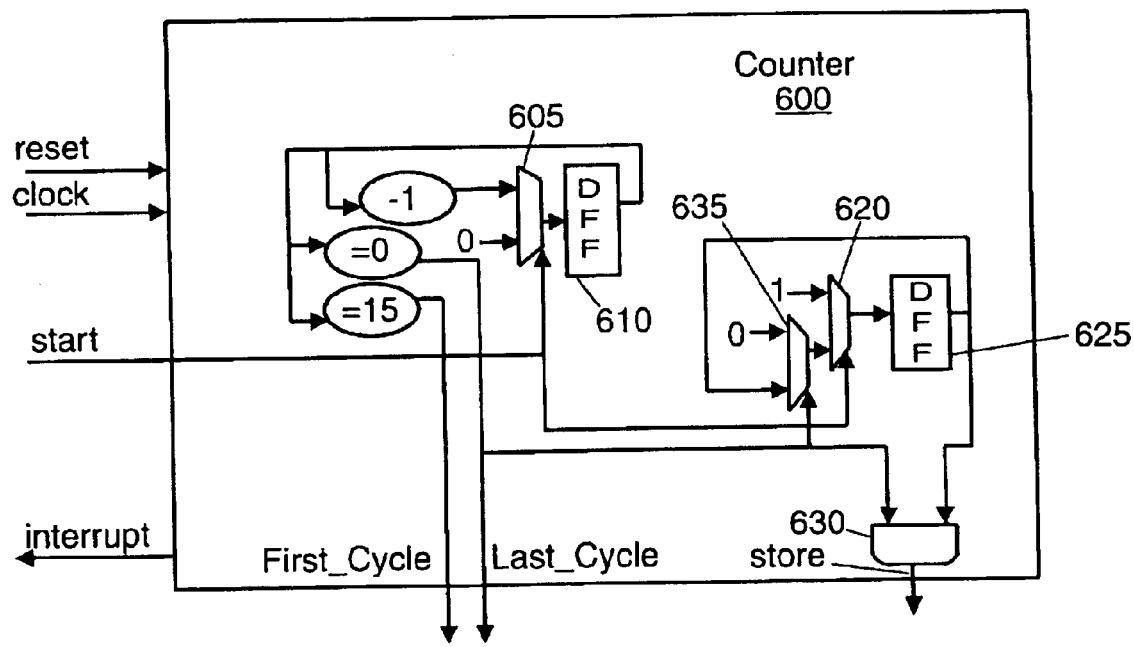
FIG. 6 is a schematic illustrating a more detailed embodiment of the invention from FIG. 5.

FIG. 6 is a schematic illustrating a more detailed embodiment of the invention from FIG. 5. One embodiment of smoothing circuit 406 is counter 600. Counter 600 is one example of a circuit configured to track processing and non-processing time periods. One skilled in the art will recognize that different circuits and logic may replace counter 600 and perform a similar function. Counter 600 receives a reset signal and resets its count, in one example the count is 16 for DES, so counter 600 counts down from 15 to zero. Counter 600 has multiplexer 605 that receives the start signal, so upon receiving the reset and start signal, counter 600 transmits a first-cycle signal and resets DFFs 610 at a count of 15. DFFs 610 transmit the count to a subtractor, or a decrementor (not shown), which reduces the count by one and multiplexer 605 selects the decremented count and transmits it to DFFs 610. The count is decremented to zero, which triggers transmission of the last-cycle signal.

Start signal toggles multiplexer 620 to select the assert, in this example a high input value of "one". Multiplexer 620 passes the high input value to DFF 625, which transmits it to AND gate 630 and multiplexer 635. Multiplexer 635 has a default select of the input from DFF 625, so multiplexer 635 transmits the high value to multiplexer 620. On the next clock cycle, the start signal is no longer asserted, so multiplexer 620 defaults to the input from multiplexer 635. The high value continues cycling during the processing time period.

At the end of the processing time period, last-cycle signal toggles multiplexer 635, causing multiplexer 635 to select the deassert, or low input value of zero in this example. Multiplexer 620 defaults to select the output of multiplexer 635 and will pass along the zero. Last-cycle signal is high on AND gate 630. DFF 625 has not received the results of the zero yet, so DFF 625 has a high output to AND gate 630. The combined high signals to AND gate 630 cause AND gate 630 to assert the store signal, triggered by the end of the processing time period.

Because counter 600 continues counting during the non-processing time period, counter 600 should not issue a store signal, which would change the stored output value at output port 410. Multiplexer 620, driven by the start signal, prevents assertion of the store signal during the non-processing time period.

Figure 7:
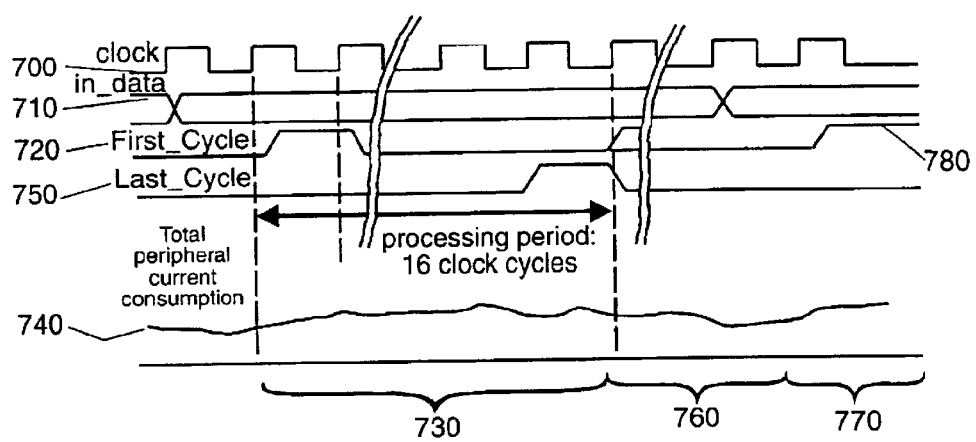
FIG. 7 is a graph illustrating a timing diagram and a current waveform for one embodiment of the invention.

FIG. 7 is a graph illustrating a timing diagram and a current waveform for one embodiment of the invention. The signals and current in FIG. 7 are described with respect to the circuit illustrated in FIG. 4. Each of user interface 402, smoothing circuit 406 and processing circuit 400 receive clock signal 700. Processing circuit 400 receives input data 710 from user interface 402, and first-cycle signal 720 from smoothing circuit 406. Start signal (not shown) has already issued from user interface 402 and began processing time period 730, which in this example is 16 clock cycles. Processing circuit 400 manipulates the input and draws current 740 during processing time period 730. At the end of processing time period 730, smoothing circuit 406 transmits last-cycle signal and the desired output is made available at output port 410. Although the input no longer needs to be manipulated in order to produce the desired output, processing circuit 400 continues to manipulate it and draw current 740 during non-processing time period 760. Start signal (not shown) again toggles and begins processing time period 770, with a first-cycle signal 780. Current 740 through processing time periods 730 and 770, and non-processing time period 760, remains in a range indicating active operation of processing circuit 400, therefore making analysis of current consumption more difficult. Internal behavior and parameters are more protected against non-intrusive attacks, for example DPA.

Figure 8:
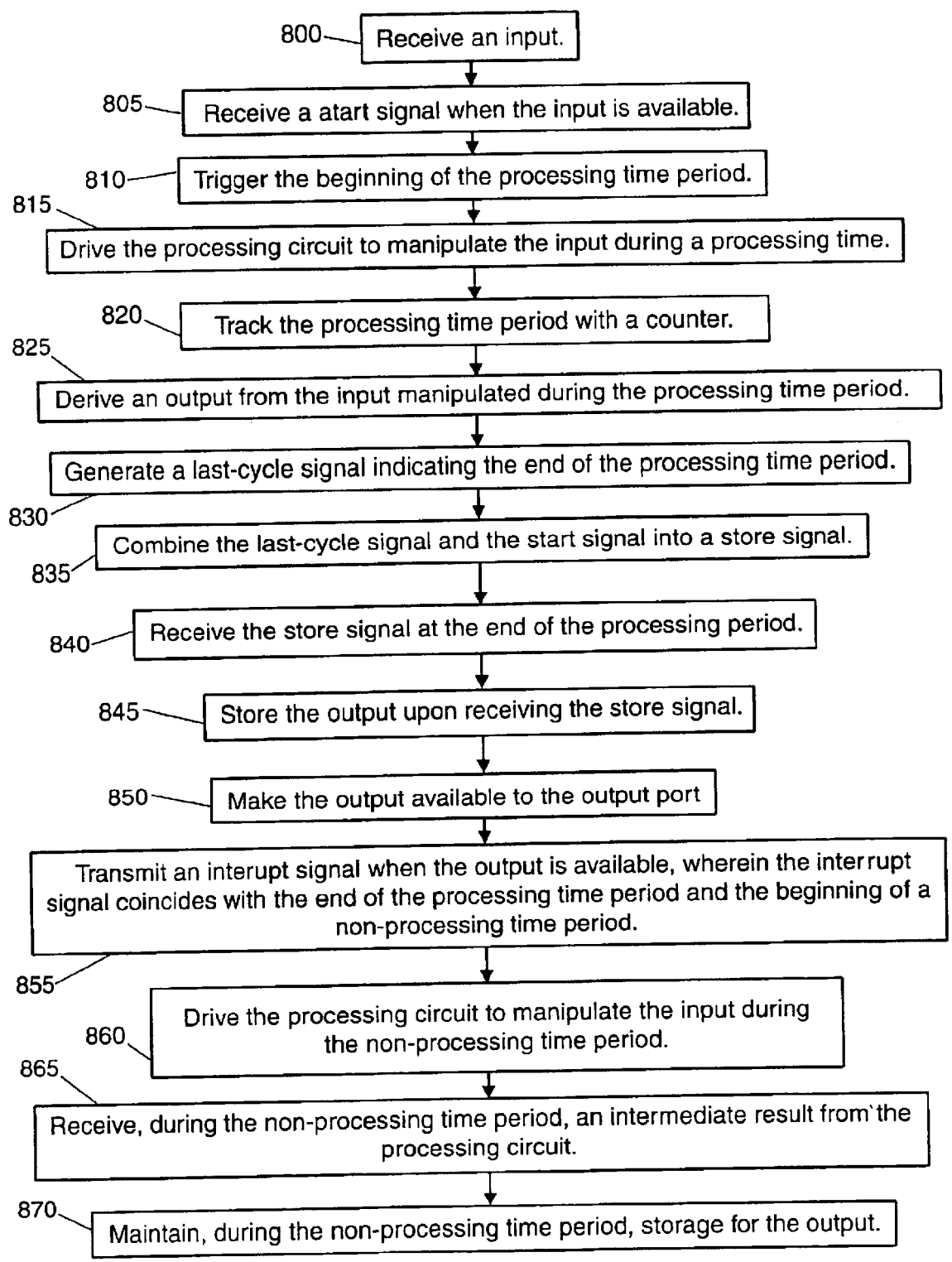
FIG. 8 is a flow diagram illustrating a method of smoothing current in a digital logic module.

FIG. 8 is a flow diagram illustrating a method of smoothing current consumption in a digital logic module having a processing circuit coupled to an output port. In block 800, receive an input. In block 805, receive a start signal when the input is available. In block 810, trigger the beginning of the processing time period. In block 815, drive the processing circuit to manipulate the input during a processing time period. In block 820, track the processing time period with a counter. In block 825, derive an output from the input manipulated during the processing time period. In block 830, generate a last-cycle signal indicating the end of the processing time period. In block 835, combine the last-cycle signal and the start signal into a store signal. In block 840, receive the store signal at the end of the processing period. In block 845, store the output upon receiving the store signal. In block 850, make the output available to the output port. In block 855, transmit an interrupt signal when the output is available, wherein the interrupt signal coincides with the end of the processing time period and the beginning of a non-processing time period. In block 860, drive the processing circuit to manipulate the input during the non-processing time period. In block 865, receive, during the non-processing time period, an intermediate result from the processing circuit. In block 870, maintain, during the non-processing time period, storage of the output.

Figure 9:
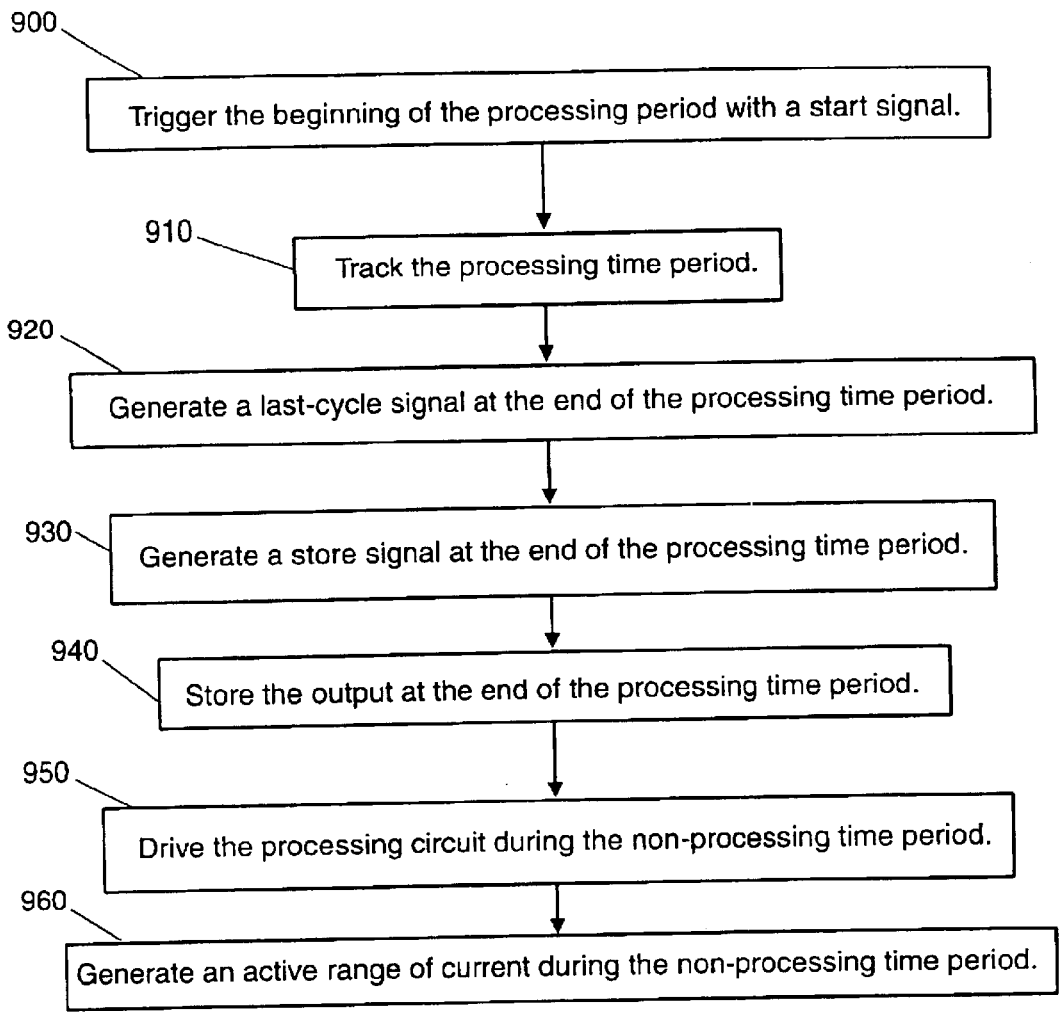
FIG. 9 is a flow diagram illustrating a method of smoothing current in a digital logic module.

FIG. 9 is a method of smoothing current consumption in a digital logic module having a processing circuit configured to receive an input and manipulate the input during a processing time period to produce an output. Production of the output is followed by a non-processing time period, wherein the processing circuit is further configured to draw an active range of current during the processing time period, and an inactive range of current during a non-processing time period. In block 900, trigger the beginning of the processing period with a start signal. In block 910, track the processing time period. In block 920, generate a last-cycle signal at the end of the processing time period. In block 930, generate a store signal at the end of the processing time period. In block 940, store the output at the end of the processing time period. In block 950, drive the processing circuit during the non-processing time period. In block 960, generate an active range of current during the non-processing time period.

As any person skilled in the art will recognize from the previous description and from the figures and claims that modifications and changes can be made to the invention without departing from the scope of the invention defined in the following claims.

What is claimed is:

1. A system for smoothing current consumption in a digital logic module comprising:
    a processing circuit configured to receive an input and manipulate the input;
    a counter coupled to the processing circuit and configured to track a processing time period during which the processing circuit manipulates the input in order to create an output wherein the counter is further configured to generate a last-cycle signal indicating the end of the processing time period, the last-cycle signal and the start signal combining to form a store signal;
    an output port coupled to the processing circuit and configured to convey the output while the processing circuit continues to operate during a non-processing time period, wherein the processing time period is followed by the non-processing time period, which ends as soon as a new processing time period begins;
    a start line coupled to the counter and configured to convey a start signal to the counter when the input is available to the processing circuit, wherein the start signal triggers the beginning of the processing time period; and
    an interrupt line coupled to the counter and configured to convey an interrupt signal from the counter when the output is available at the output port, wherein the interrupt signal coincides with the end of the processing time period and the beginning of the non-processing time period; and
    a storage circuit coupled to the output port and configured to store the output upon receipt of the store signal, and during the non-processing time period transmit the output to the output port.

2. The system of claim 1 further comprising: a storage circuit coupled to the output port and configured to store the output during the non-processing time period and transmit the output to the output port.

3. The system of claim 1 wherein the storage circuit further comprises:
    a flip-flop coupled to the output port and configured to transmit the output to the output port during the non-processing time period; and
    a multiplexer coupled to the counter, the processing circuit, and the flip-flop and configured to transmit the output to the flip-flop and to retransmit the output to the flip-flop upon receiving the store signal.

4. A system for smoothing current consumption in a digital logic module having a processing circuit configured to receive an input and manipulate the input during a processing time period to produce an output, a non-processing time period following production of the output, the processing circuit further configured to draw an active range of current during the processing time period and an inactive range of current during the non-processing time period, the active range of not less than the inactive range of current, the system comprising:
    a smoothing circuit coupled to the processing circuit and configured to engage the processing circuit during the non-processing time period and to cause the processing circuit to draw an active range of current during the non-processing time period;
    a counter in said smoothing circuit coupled to the processing circuit and configured to track the processing time period wherein the counter is further configured to generate a last-cycle signal indicating the end of the processing time period, the last-cycle signal and the start signal combining to form a store signal;
    a first storage circuit coupled to the processing circuit and configured to store the output during the non-processing time period;
    a start line coupled to the counter and configured to convey a start signal to the counter when the input is available to the processing circuit, wherein the start signal triggers the beginning of the processing time period; and
    an interrupt line coupled to the counter and configured to convey an interrupt signal from the counter when the output is available, wherein the interrupt signal coincides with the end of the processing time period and the beginning of the non-processing time period; and
    a second storage circuit coupled to the processing circuit and configured to receive an intermediate result from the processing circuit during the processing time period, to receive the store signal and to store the intermediate result as the output, wherein during the non-processing time period the processing circuit continues to manipulate the input and generates the active range of current.

5. The system of claim 4 wherein the storage circuit is further configured, during the non-processing time period, to receive the intermediate result and to maintain storage of the output.

6. A method of smoothing current consumption in a digital logic module having a processing circuit coupled to an output port, the method comprising:
    receiving an input;
    driving the processing circuit to manipulate the input during a processing time period;
    deriving an output from the input manipulated during the processing time period;
    making the output available to the output port;
    driving the processing circuit to manipulate the input during a non-processing time period;
    tracking the processing time period with a counter;

receiving a start signal when the input is available;

triggering the beginning of the processing time period;

transmitting an interrupt signal when the output is available, wherein the interrupt signal coincides with the end of the processing time period and the beginning of the non-processing time period; generating a last-cycle signal indicating the end of the processing time period;

combining the last-cycle signal and the start signal into a store signal;

receiving the store signal at the end of the processing period; and storing the output upon receiving the store signal.

7. The method of claim 6 further comprising:

receiving, during the non-processing time period, an intermediate result from the processing circuit; and maintaining, during the non-processing time period, storage of the output.

8. A method of smoothing current consumption in a digital logic module having a processing circuit configured to receive an input and manipulate the input during a processing time period to produce an output, production of the output being followed by a non-processing time period, wherein the processing circuit is further configured to draw an active range of current during the processing time period, and an inactive range of current during a non-processing time period, the method comprising:

driving the processing circuit during the non-processing time period;

generating an active range of current during the non-processing time period;

tracking the processing time period;

generating a last-cycle signal at the end of the processing time period;

triggering the beginning of the processing period with a start signal; and generating a store signal at the end of the processing time period.

9. The method of claim 8 further comprising:

storing the output at the end of the processing time period.

10. The method of claim 8 wherein driving the processing circuit during the non-processing time period further comprises:

manipulating the input during the non-processing time period.

11. The method of claim 8 further comprising:

saving the output during the non-processing time period.

* * * * *